INVENTOR.
John W. Lakin

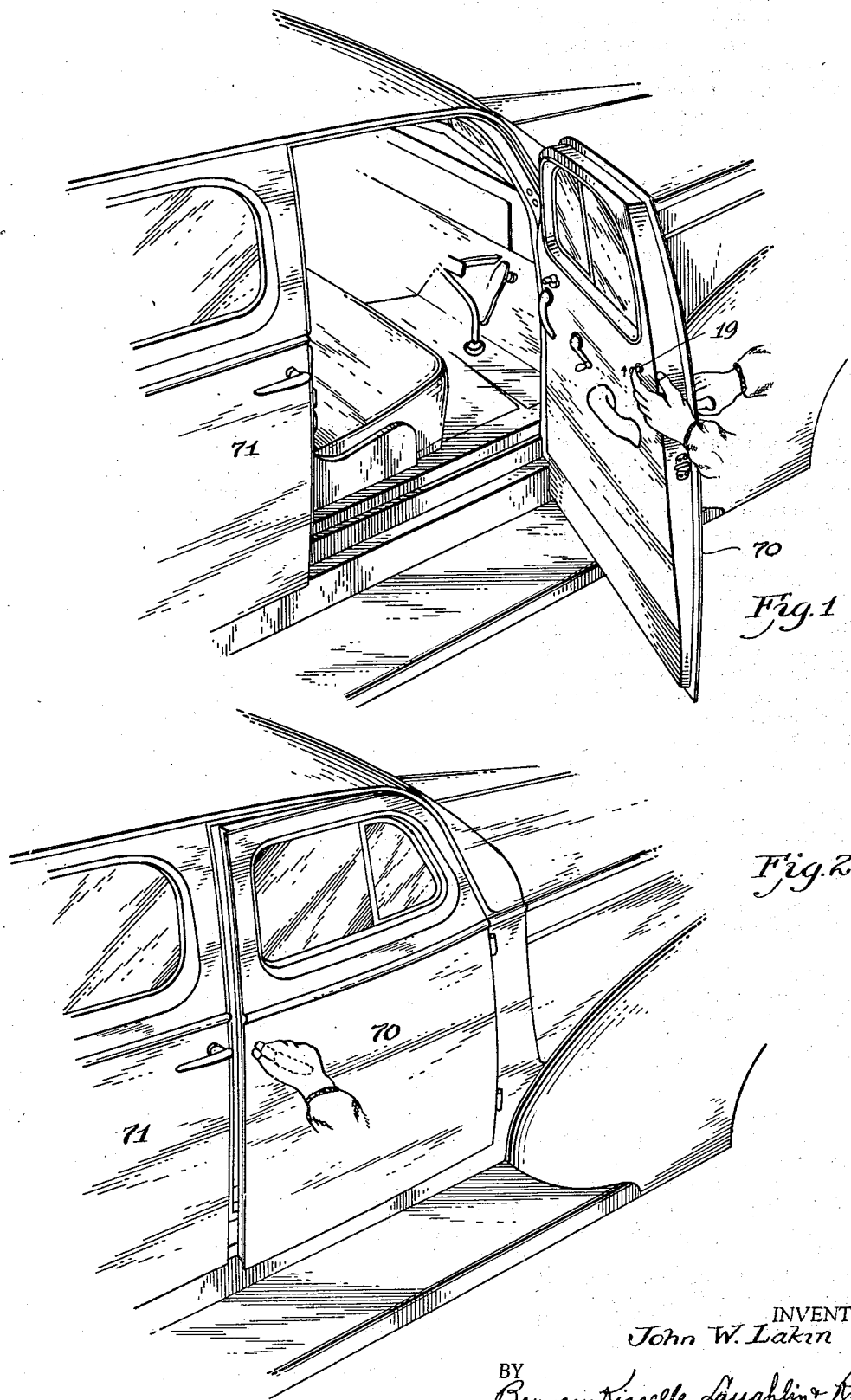

Dec. 26, 1939. J. W. LAKIN 2,184,350
ELECTRICAL COINCIDENTAL DOOR LOCKING SYSTEM FOR AN AUTOMOTIVE VEHICLE
Filed Nov. 9, 1937 5 Sheets-Sheet 3

INVENTOR.
John W. Lakin
BY Barnes, Kisselle, Laughlin & Raisch
ATTORNEYS

Dec. 26, 1939.  J. W. LAKIN  2,184,350
ELECTRICAL COINCIDENTAL DOOR LOCKING SYSTEM FOR AN AUTOMOTIVE VEHICLE
Filed Nov. 9, 1937  5 Sheets-Sheet 4
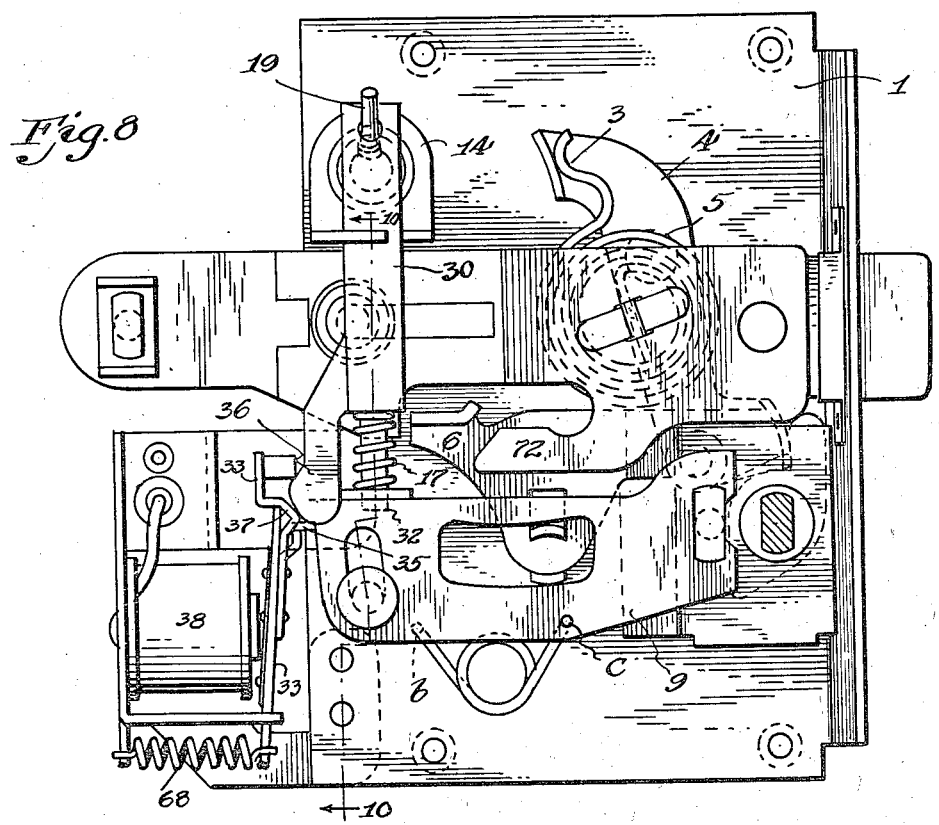
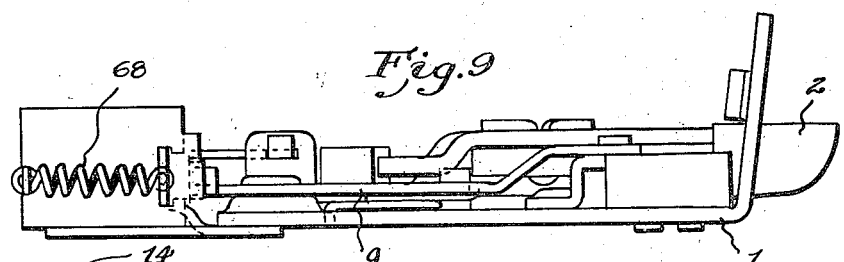
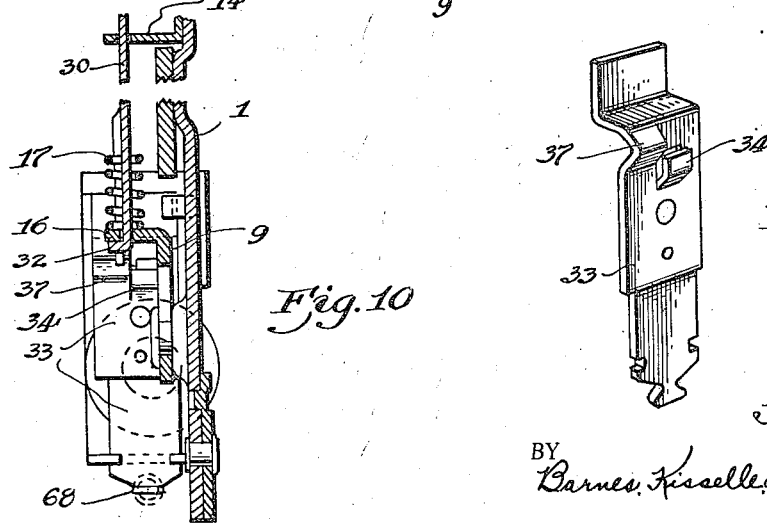
INVENTOR.
John W. Lakin
BY
Barnes, Kisselle, Laughlin & Raisch
ATTORNEYS

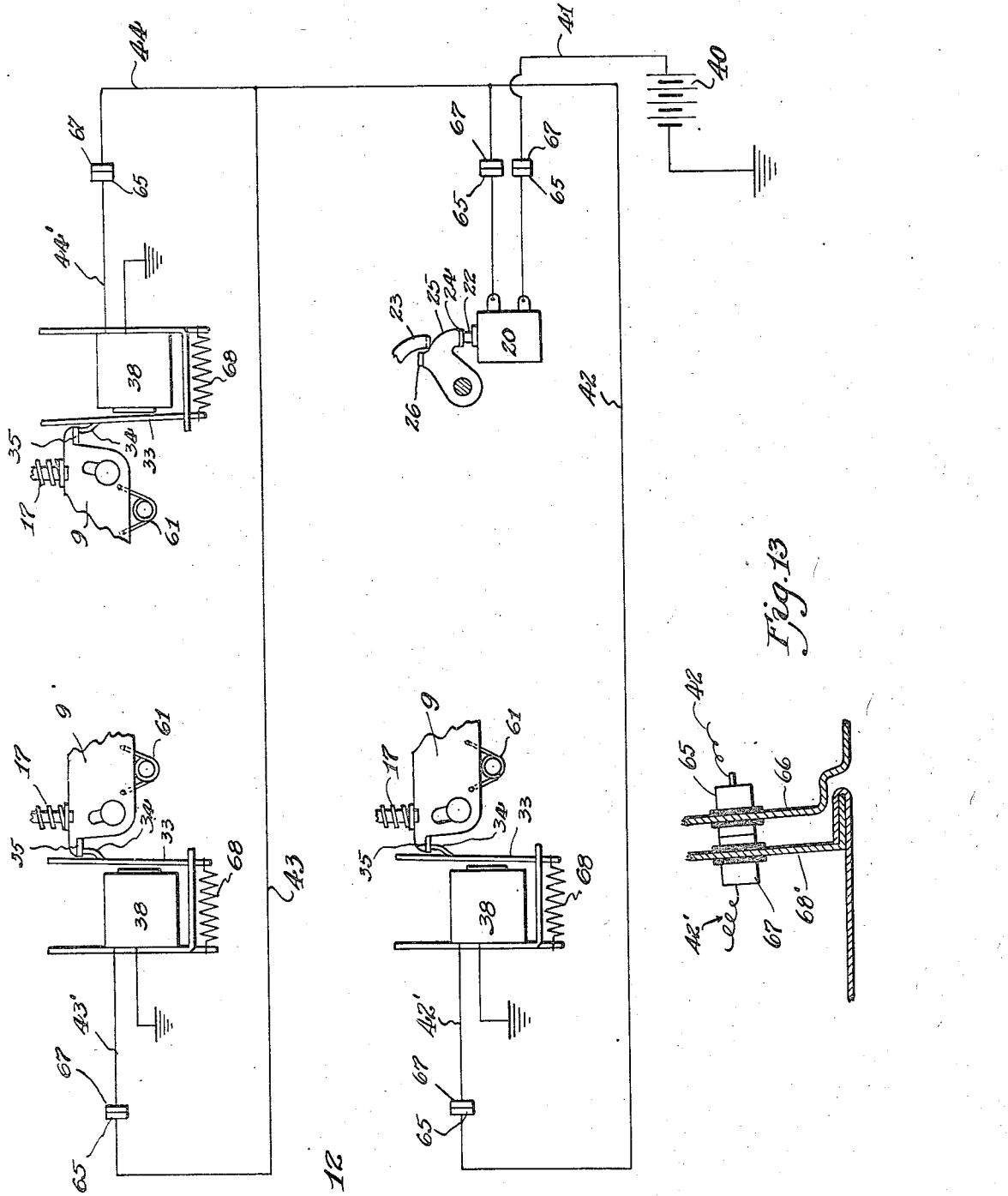

Patented Dec. 26, 1939

2,184,350

UNITED STATES PATENT OFFICE 2,184,350

ELECTRICAL COINCIDENTAL DOOR LOCKING SYSTEM FOR AN AUTOMOTIVE VEHICLE

John W. Lakin, Detroit, Mich., assignor to Ternstedt Manufacturing Company, Detroit, Mich., a corporation of Michigan Application November 9, 1937, Serial No. 173,669

7 Claims. (Cl. 70—264)

This invention relates to an electrical coincidental door locking system for an automotive vehicle.

The Andersen-Bowlus Patent 2,039,873 shows and describes the operation of a mechanical automobile door lock that has been and is now being used extensively in the automobile field and to which the automobile owning public has become accustomed.

It is the object of this invention to produce an electrical coincidental door locking system which can be operated in the manner of the above-mentioned Anderson-Bowlus lock and which accords with the habits already formed by the owners of these automobiles which have been and are using the Andersen-Bowlus lock. This object has been achieved by so adapting the front curb door lock, or Andersen-Bowlus lock described in the above-mentioned patent, so that the customary manipulation of this lock will electromagnetically coincidentally lock the other door locks of the car.

In the drawings:

Fig. 1 is a fragmentary perspective of an automobile showing the front curb door open and the inside snap-lever being manipulated to disconnect the outside door handle from the rollback.

Fig. 2 shows the door being closed with the outside door handle turned down to prevent the outside rollback in the closing of the door from again being reconnected with the latch bolt.

Fig. 8 is a front elevation of one of the secondary locks unlocked.

Fig. 9 is a plan view of the lock shown in Fig. 8.

Fig. 10 is a section along the line 10—10 of Fig. 8.

Fig. 11 is a detail of the detent armature element.

Fig. 12 is a schematic showing of the coincidental electrical locking circuit.

Fig. 13 is a detail of the separable contacts between the door and body hinge pillars.

Figure 3:
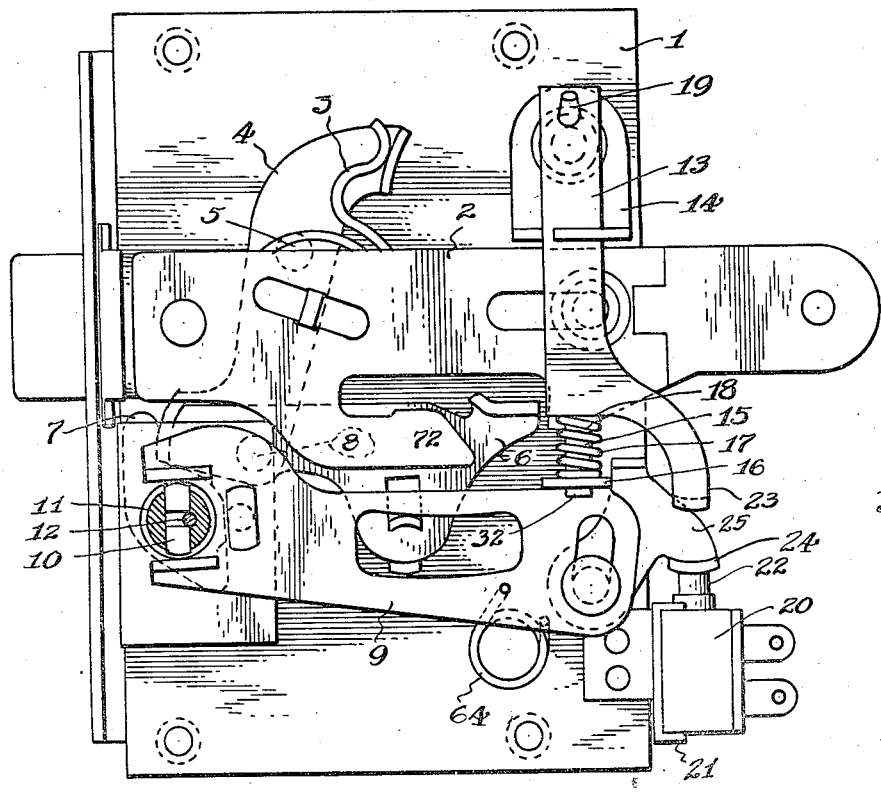
Fig. 3 is an elevation of the curb door lock unlocked, that is, the outside rollback connected with the latch bolt.

The master lock shown in Figs. 3 to 6 inclusive comprises a frame 1 upon which is slidably mounted a reciprocating latch bolt 2. The latch bolt 2 carries the bolt spring 3 which acts against a lever 4 pivotally mounted as at 5 on the frame 1 to project the bolt. A connector 6 between the outside rollback 7 and the bolt is pivotally mounted as at 8 on the lever 4. The pivoted connector 6 is arranged to be swung into set and released positions by means of a lever 9. When the connector 6 is set, as shown in Fig. 3, the outside rollback is operatively connected with the bolt 2 and rotation of the outside rollback will retract the bolt. When the connector 6 is released, as shown in the full lines of Fig. 4, the outside rollback is disconnected from the bolt and rotation of the outside rollback is ineffective to retract the bolt.

The lever 9 can be swung to either set or release the connector 6 from the outside of the vehicle body by means of a bolt 10 slidably mounted in the outside door handle spindle 11 and operated by the eccentric pin 12 on the end of a key operated cylinder lock shaft. The construction and the mode of operation of the lock thus far described is identical with that shown in the above-mentioned Andersen, et al. patent.

The lever 9 can be operated from the inside of the car to set and release the connector 6 by means of a vertically slidable plate 13 slidably mounted at its upper end in the bracket 14 fixed to the latch frame 1. The lower end 15 of the slide plate 13 has a sliding fit in an opening in the horizontal flange 16 of the lever 9. A coil spring 17 is mounted over the end 15 of the slide plate and between the horizontal flange 16 and the shoulder 18 on the slide plate 13. The slide plate 13 can be raised and lowered from the inside of the body by a small lever 19. When the slide plate 13 is slid downwardly the driving force is transmitted from the slide 13 through the coil spring 17 to the lever 9 to swing the same downwardly and release the connector 6. As the lever 9 in the master lock moves downwardly the over center spring 64 which is connected at one end to the latch frame 1 and at the other end to the lever 9, swings over center and assists in swinging the lever 9 downwardly. This locks the front curb door lock, that is, releases the connector 6 and makes the outside rollback ineffective to retract the bolt 2.

A spring plunger or push button type of switch generally designated 20 is carried by the plate 21 which is fixed to the latch frame 1. The push button switch 20 comprises the plunger 22 which is normally held in projected position (Fig. 3) by means of a spring and in such case the switch 21 is open. When the plunger 22 is depressed against the force of the usual spring, the switch contacts come together and the switch is closed. After the front curb door lock is locked from the inside, as above described, the slide 13 is slid downwardly still further, dotted line showing, Fig. 4 which compresses spring 17 and brings the arm 23 into contact with the flange 24 of the lever 25. This swings the lever 25 downwardly and depresses the spring plunger 22 to close the switch 20. As soon as the slide 13 is released the spring 17 again projects it upwardly to release the plunger 22 which opens the switch 20, full lines, Fig. 4.

Figure 4:
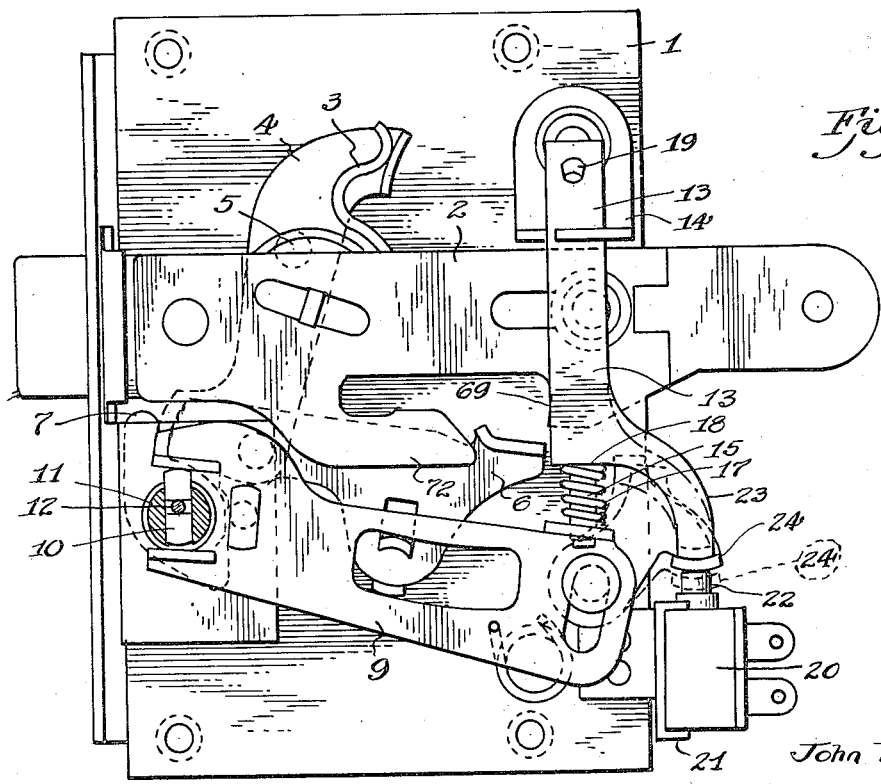
Fig. 4 is an elevation of the curb door lock showing in the full lines the normal locking of the lock from inside the door and showing in the dotted lines the movement of the inside operated locking slide beyond normal locking position to close the master switch in the electrical circuit.
Figure 5:
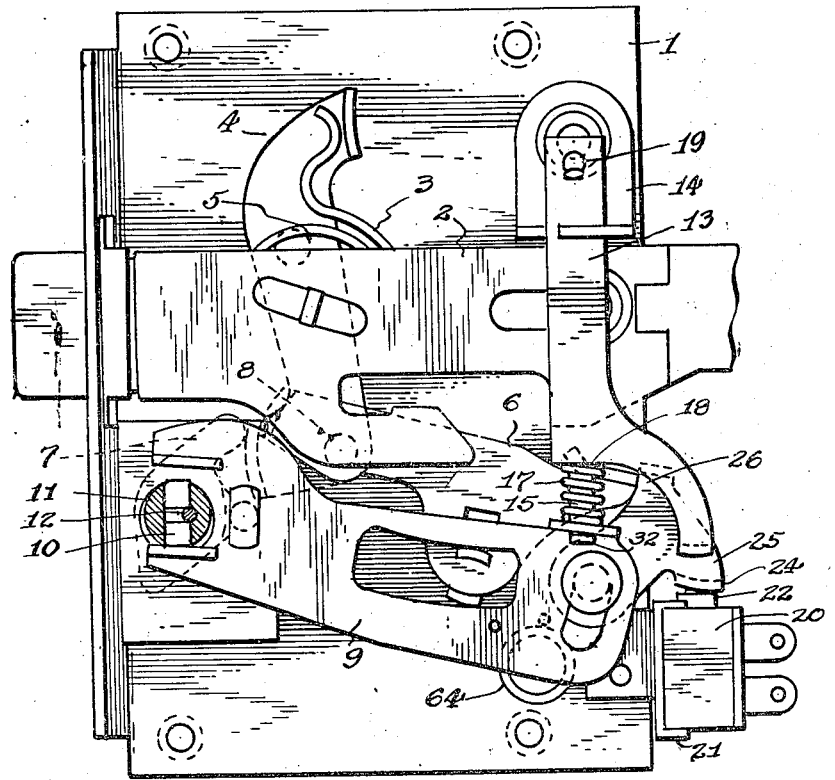
Fig. 5 is an elevation of the master lock locked (that is, the outside rollback disconnected from the latch bolt) showing the rollback turned to bolt retracting position to thereby close the master switch.
Figure 6:
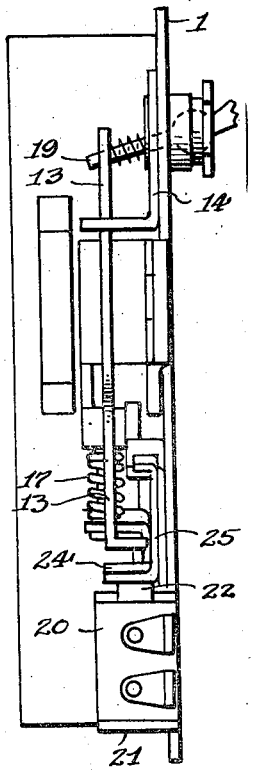
Fig. 6 is an end view of the latch shown in Fig. 5.
Figure 7:
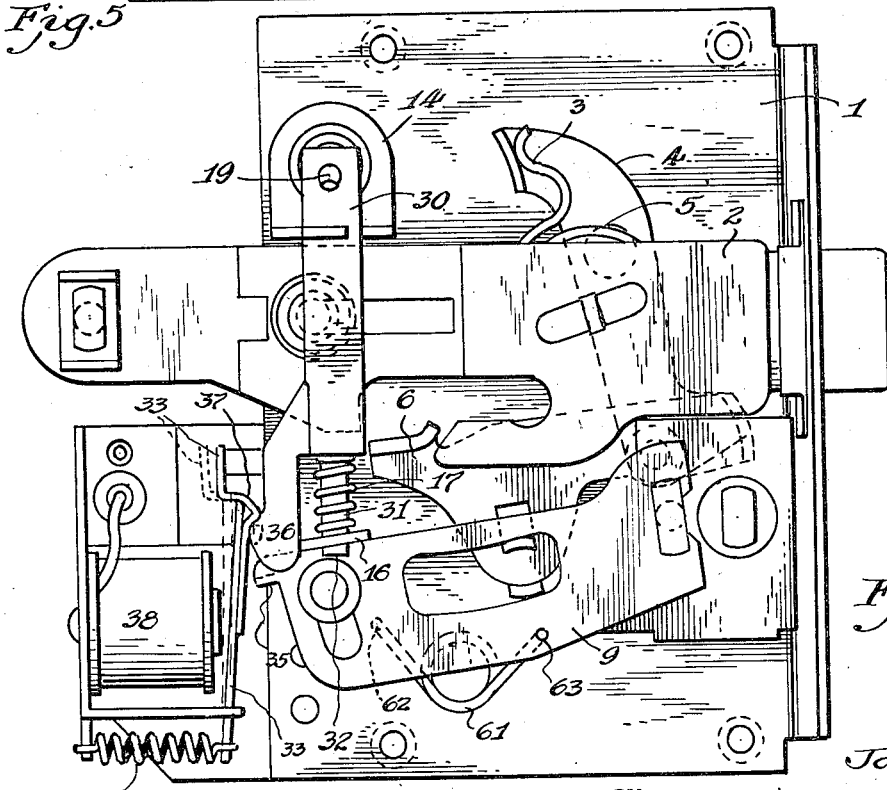
Fig. 7 is a front elevation of one of the secondary locks locked, that is, with the outside rollback disconnected from the latch bolt.

The switch 22 can also be closed from the outside of the door by rotating the rollback 7 in bolt retracting direction when the connector 6 is released, Fig. 5. This causes the connector 6 as it travels to the right, Fig. 5, to engage the lug 26 on the lever 25 which rotates the lever 25 clockwise to in turn depress the plunger 22 which closes the switch contacts. As soon as the outside door handle or rollback 7 is released the bolt spring 3 turns the rollback 7 counterclockwise to the full line position, Fig. 4, and slides the connector 6 to the left which releases the pressure on the spring plunger 22 and permits the switch 20 to again open.

In Figs. 7 through 11 there is shown the secondary lock which is used on the other three doors of the vehicle body. This lock is similar to the master lock and the corresponding parts bear the same reference numerals. However, this secondary lock is arranged to be manually locked and unlocked from inside the door and electrically locked whenever the master lock, shown in Fig. 3, is operated as above described to close the switch 20.

For manual locking of the secondary lock this lock is provided with a slide plate 30 operated by the usual snap lever 19 on the inside of the door. The plate 30 is slidably guided on the latch frame 1 also by a bracket 14 and has its lower end portion 31 slidably mounted in an opening in the flange 16 of the lever 9. The plate 30 in the secondary lock and the plate 13 in the primary lock are each provided with an outwardly turned lug 32 which engages the flange 16 to raise the lever 9 as the plates 13 and 30 are slid upwardly. In the secondary lock whenever the connector 6 is set, that is, connects the outside rollback 7 with the latch bolt 2, the spring 61 is compressed. However, the lever 9 is held in raised position by a pivoted detent 33 having a lug 34, Fig. 11, which engages the end 35 of the lever 9. The slide plate 30 is provided with a cam portion 36 which engages an inclined portion 37 of the detent lever 33. When the plate 30 is slid downwardly, it swings the detent 33 counterclockwise stressing tension springs 68, releasing the lug 34 from the end 35 of the lever 9. This permits the spring 61 which is normally under tension to expand and thereby swing the lever 9 downwardly thus releasing the connector 6. The coil spring 61, one end of which is secured to the latch frame 1 as at 62 and the other end to the lever 9 as at 63, is normally under tension both when the lever 9 is in raised position and in lowered position and tends at all times to swing the lever 9 downwardly.

The detent 33 can also be released by means of the electromagnet 38. When the magnet 38 is energized, the detent lever 33 serves as an armature which is drawn to the magnet 38 and the lug 34 is withdrawn from the end 35 of the lever 9 which also permits the spring 61 to release the connector 6.

The wiring diagram for the coincidental locking system is shown in Fig. 12. The switch 20 on the master lock is connected to the battery 40 by the wire 41. The switch 20 is also connected to the electromagnets 38 by means of the wires 42, 42', 43, 43', 44, and 44' as shown. Thus it will be seen that the several magnets 38 are connected in parallel.

The wires 42, 43 and 44 are carried by the body proper and each is connected to a contact 65 carried by, and insulated from, a body hinge pillar 66. The wires 42', 43' and 44' are each carried by a door and are connected to a contact 67 carried by, but insulated from, the door hinge pillar 68. When the doors are closed the contacts 65 and 67 come together and complete the circuit between wires 42 and 42', 43 and 43', 44 and 44'.

The operation of the lock is as follows: The locking system can be operated from within the body when all the doors are closed by means of lever 19 on the front curve door or master lock, Figs. 3 and 4. When the lever 19 is operated the slide 13 moves downwardly until it reaches the full line position in Fig. 4. This locks the front curb door by releasing connector 6, that is, connector 6 is swung downwardly so that when retracted it will not abut lug 69 on bolt 2. At this time the other locks are not locked. However, if the inside lever 19 be swung upwardly on the inside of the car still further, slide 13 will move downwardly still further to the dotted line position, Fig. 4. This depresses plunger 22 and closes switch 20 which completes the circuit from the battery to each of the magnets 38. The energized magnets 38 on each of the secondary locks retract the detents 33 from lugs 35 on the levers 9 which permits the torsion springs 61 to swing the levers 9 downwardly and release the connector 6 from the bolt on each of the secondary locks.

The doors can be locked from without the car in two ways: First, if all the doors are closed, that is, the front curb door 70 which carries the master lock as well as all the other doors 71 which carry the secondary locks, then the operator by means of a key projects bolt 10 in the outside door handle spindle 11 from the position shown in Fig. 3 to that shown in Fig. 4. This mechanically releases connector 6 on the front curb door lock, that is, disconnects the outside door handle and outside rollback 7 from the bolt so that the outside door handle and outside rollback can be swung from the horizontal position clockwise downwardly to the position shown in Fig. 2 without retracting the front curb door lock bolt. The operator now turns the outside door handle downwardly to the position shown in Fig. 2. This rotates the outside rollback 7 from the position shown in Fig. 3 to that shown in Fig. 5. This shifts the connector 6 to the right which in turn rotates the lever 25 to depress plunger 22 which closes switch 20. The solenoids 38 are again energized and release the detents on the secondary locks which permits the torsion springs 61 to release the connectors 6 on the secondary locks.

The doors can also be locked from the outside as follows when all of the car doors are closed except the front curb door 70, as shown in Fig. 1. With the curb door open the operator throws the lever 19 upwardly on the inside of the door. This moves slide 13 downwardly to the full line position, Fig. 4, releasing connector 6 on the master lock. The outside door handle is now turned downwardly to the position shown in Fig. 2 while the door is still open. This swings the outside rollback 7 to the position shown in Fig. 5 which through connector 6 and lever 25 closes switch 20. While still holding the outside door handle in turned down position, the operator swings the door closed. As the door closes contacts 65 and 67 on the front curb door hinge pillar and front body hinge pillar come together completing the circuit between the battery and the electromagnets 38 on the other doors. At this time the electromagnets 38 are energized and coincidentally release the connectors 6 on the secondary locks in the manner above described.

Each of the locks can be unlocked from within the vehicle body either by retracting the bolt 2 with the inside door handle which through the cam 72 raises the connector 6 and connects the outside rollback with the bolt or by raising the slide 13 by means of lever 19 which also raises the connector 6 to set the same so that the outside rollback is connected with the bolt.

The curb door lock can be unlocked from the outside by means of the key controlled bolt 10 which upon being shifted from the position shown in Fig. 4 to that shown in Fig. 3 resets the connector 6 on the master lock.

I claim:

1. In a coincidental locking system for a plurality of automotive vehicle doors comprising in combination a master lock for one of said doors, a secondary lock for another of said doors, a retractable latch bolt for each of said locks, an outside door handle for retracting each bolt, means including an electromagnet for rendering the outside door handle for said secondary lock bolt ineffective to retract its bolt, a retractor for said master lock adapted to be set and released, means for moving the retractor to its respective positions, said retractor when set operatively connecting the master lock outside door handle with its bolt and said retractor when released operatively disconnecting said outside master lock door handle from its bolt whereby operation of the master lock outside door handle is ineffective to retract its bolt, a source of electrical energy in circuit with the electromagnet on the secondary lock, and a switch for making and breaking said circuit controlled by the said master lock outside door handle and retractor when released whereby when the retractor on the master lock is released operation of the master lock outside door handle actuates the retractor which closes the said switch thereby energizing the electromagnet and rendering the secondary lock outside door handle ineffective to retract its bolt.

2. In a coincidental locking system for a plurality of automotive vehicle doors comprising in combination a master lock for one of said doors, a secondary lock for another of said doors, a retractable latch bolt for each of said locks, an outside door handle for retracting each bolt, means including an electromagnet for rendering the outside door handle for said secondary lock bolt ineffective to retract its bolt, a retractor for said master lock adapted to be set and released, said retractor when set operatively connecting the master lock outside door handle with its bolt and said retractor when released operatively disconnecting said outside master lock door handle from its bolt whereby operation of the master lock outside door handle is ineffective to retract its bolt, a manually operatable controller on the master lock for releasing the retractor on the master lock, a source of electrical energy in circuit with the electromagnet on the secondary lock, and a switch for making and breaking said circuit controlled by the said master lock outside door handle and retractor when released whereby when the retractor on the master lock is released operation of the master lock outside door handle actuates the retractor which closes the said switch thereby energizing the electromagnet and rendering the secondary lock outside door handle ineffective to retract its bolt.

3. In a coincidental locking system for a plurality of automotive vehicle doors comprising in combination a master lock for one of said doors, a secondary lock for another of said doors, a retractable latch bolt for each of said locks, an outside door handle for retracting each bolt, means including an electromagnet for rendering the outside door handle for said secondary lock bolt ineffective to retract its bolt, a shiftable retractor for said master lock adapted to be set and released, means for shifting the retractor to its respective positions, said shiftable retractor when set operatively connecting the master lock outside door handle with its bolt and said shiftable retractor when released operatively disconnecting said outside master lock door handle from its bolt whereby operation of the master lock outside door handle is ineffective to retract its bolt, a source of electrical energy in circuit with the electromagnet on the secondary lock, a self-opening switch for making and breaking said circuit, said shiftable retractor when released adapted to be shifted by the operation of the master outside lock handle to bolt retracting position to close the said switch whereby when the doors are closed the electromagnet on the secondary lock is energized and the said means including the electromagnet renders the secondary lock outside door handle ineffective to retract its bolt.

4. In a coincidental locking system for a plurality of automotive vehicle doors comprising in combination a master lock for one of said doors, a secondary lock for another of said doors, a retractable latch bolt for each of said locks, a rotatable outside door handle for retracting each bolt, means including an electromagnet for rendering the outside door handle for said secondary lock bolt ineffective to retract its bolt, a shiftable retractor for said master lock adapted to be set and released, means for shifting said retractor to its respective positions, said shiftable retractor when set operatively connecting the master lock outside door handle with its bolt and said shiftable retractor when released operatively disconnecting said outside master lock door handle from its bolt whereby rotation of the master lock outside door handle to bolt retracting position shifts the retractor but is ineffective to retract its bolt, a source of electrical energy in circuit with the electromagnet on the secondary lock, a switch for making and breaking said circuit adapted to be closed by the released retractor when shifted by rotation of the outside master door lock handle to bolt retracting position whereby the electrical circuit is closed and the said means including the electromagnet on the secondary lock acts to render the secondary lock outside door handle ineffective to retract its bolt.

5. In a coincidental locking system for a plurality of automotive vehicle doors comprising in combination a master lock for one of said doors, a secondary lock for another of said doors, a retractable latch bolt for each of said locks, a rotatable outside door handle for retracting each bolt, a shiftable retractor for each lock adapted to be set and released, means for shifting said retractor to its respective positions, each said retractor when set operatively connecting its lock outside door handle with its bolt and when released operatively disconnecting said outside door handle from its bolt whereby operation of the outside door handle shifts the retractor but is ineffective to retract its bolt, resilient means tending to release the said retractor on the secondary lock, a spring detent for latching the retractor in set position, and an electromagnet for releasing the said spring detent, a source of electrical energy in circuit with said electromagnet, and a switch for making and breaking said circuit adapted to be closed by the retractor for the master lock when the master lock retractor is released and the outside master lock handle rotated to bolt retracting position whereby the electrical circuit is completed and the electromagnet releases the spring detent and permits the resilient means to release the retractor on the secondary lock.

6. In a coincidental locking system for a plurality of automotive vehicle doors comprising in combination a master lock for one of said doors, a secondary lock for another of said doors, a retractable latch bolt for each of said locks, a rotatable outside door hande for retracting each bolt, a shiftable retractor for each lock adapted to be set and released, each said retractor when set operatively connecting its lock outside door handle with its bolt and when released operatively disconnecting said outside door handle from its bolt whereby operation of the outside door handle shifts the retractor but is ineffective to retract its bolt, a manually operative controller on the inside of the door for releasing the retractor on the master lock, resilient means tending to release the said retractor on the secondary lock, a spring detent for latching the retractor in set position, and an electromagnet for releasing the said spring detent, a source of electrical energy in circuit with said electromagnet, and a switch for making and breaking said circuit adapted to be closed by the retractor for the master lock when the master lock retractor is released and the outside master door lock handle rotated to bolt retracting position whereby when the master lock door is open the master lock outside handle can be manually disconnected from the master lock bolt and as the master door is moved toward closed position the master lock outside handle is rotated to bolt retracting position whereupon the retractor closes the switch which energizes the electromagnet, releases the spring detent and permits the resilient means to release the retractor on the secondary lock.

7. In a coincidental locking system for a plurality of automotive vehicle doors comprising in combination a master lock for one of said doors, a secondary lock for another of said doors, a retractable latch bolt for each of said locks, a rotatable outside door handle for retracting each bolt, a shiftable retractor for each lock adapted to be set and released, each said retractor when set operatively connecting its lock outside door handle with its bolt and when released operatively disconnecting said outside door handle from its bolt whereby operation of the outside door handle shifts the retractor but is ineffective to retract its bolt, mechanism including a key operated means operatable from without the master lock door for releasing said master lock retractor, resilient means tending to release the said retractor on the secondary lock, a spring detent for latching the retractor in set position, and an electromagnet for releasing the said spring detent, a source of electrical energy in circuit with said electromagnet, and a switch for making and breaking said circuit adapted to be closed by the retractor for the master lock when the master lock retractor is released and the outside master door lock handle rotated to bolt retracting position whereby the electrical circuit is completed and the electromagnet releases the spring detent and permits the resilient means to release the retractor on the secondary lock.

JOHN W. LAKIN.